Aug. 19, 1958  C. L. NORTON, JR., ET AL  2,847,958
WELD BACKING RING OF MOLDED SAND AND BINDER
WITH NOTCHED INNER PERIPHERY
Filed Feb. 15, 1956
FIG. 3
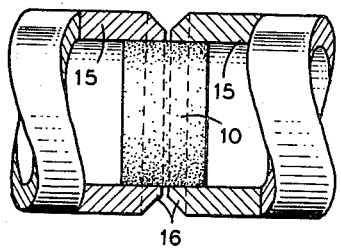
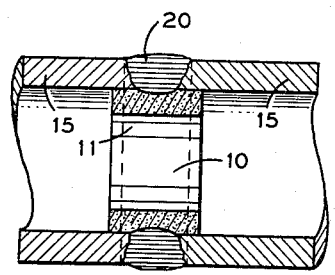
FIG. 4

INVENTORS
Charles L. Norton, Jr.
BY Leonard D. Christie
*J. P. Moran*
ATTORNEY

United States Patent Office 2,847,958
Patented Aug. 19, 1958

2,847,958

WELD BACKING RING OF MOLDED SAND AND BINDER WITH NOTCHED INNER PERIPHERY

Charles L. Norton, Jr., New York, N. Y., and Leonard D. Christie, Jr., Old Greenwich, Conn., assignors to The Babcock & Wilcox Company, New York, N. Y., a corporation of New Jersey Application February 15, 1956, Serial No. 565,734

5 Claims. (Cl. 113—111)

This invention relates to backing means for use in forming circumferential fusion welded joints between the ends of tubular metal elements or components, and, more particularly, to a novel, easily removable internal backing ring or sleeve of granular material bonded with an organic binder evolving a weld metal protecting gaseous atmosphere when subjected to the heat of an arc welding operation.

In the construction of tubular pressure vessels, tubular heat exchangers, steam generators and the like, the butt welding of tubular components is generally effected by a fusion arc welding process using a fusible metal weld rod to deposit weld metal into a welding groove. Due to the practical impossibility of depositing a welding groove root closing bead inside a relatively small diameter tubular component, all the welding must be done from outside the tube. Correspondingly, means must be provided to prevent the deposited weld metal from projecting inwardly beyond the inner surface of the components to eliminate the necessity for reaming or otherwise machining the inner surface of the welded joint to provide for full flow area at the joint. A gap at the root of the welding groove is necessary to assure complete fusion all the way through the wall thickness of the tubular components.

The backing device used for such circumferential fusion welds is commonly known as a weld backing ring. Various forms of backing rings have been used, including steel rings, copper rings, ring supports holding granular or other loose backing material against the base of the welding groove, ceramic rings, and others. Many of the known backing devices, however, are not useable, in a practical sense, for the butt welding of relatively small diameter tubing as distinguished from larger diameter headers and drums. This is due, in part, to the difficulty in positioning backing means in such tubing before welding and the difficulty in removing the backing means after the weld is completed.

Steel backing rings, while relatively inexpensive, are not considered satisfactory for shop practice as they are too easy to burn through during welding. In addition, they do not always produce a satisfactory inside surface at the joint and are difficult to remove from the tubing after the joint has been completed.

The liability to burn through of steel backing rings has led to consideration of backing rings of refractory material. To be satisfactory for use in fusion butt welding tubes, such rings must have certain characteristics such ability to retain integrity during the time needed to form the welded joint, sufficient refractoriness to withstand the welding heat without fusing to cause non-metallic inclusions or porosity in the weld, and ease, completeness, and cleanliness of removal when the weld has been completed. In addition, the size variations between rings should be of small magnitude so that all tubes of the same diameter, to be butt welded, can be prepared by machining to the same size.

Fused silica rings have been tried with successful results, but such rings are not only far too expensive for production welding but also are difficult to obtain in all desired sizes due to manufacturing difficulties. Fired rings of koalin, fire clay, or mullite composition have been used with some success insofar as weld soundness is concerned, but are extremely difficult to remove after completion of the weld. Dried or baked rings of refractory compositions bonded with sodium silicate or lignone have proven unsatisfactory in practice due to causing poor welding conditions and considerable gas porosity in the weld.

In accordance with the present invention, it has been found that a weld backing ring fully and satisfactorily meeting all the foregoing criteria as to cost, weld soundness, easy removability, sufficient strength to retain its integrity during welding, and non-fusibility under welding heat is provided by a baked, compact, annular core of stable granular refractory material and an organic binder, such as a synthetic resin or linseed oil, capable of evolving a weld protecting gas under welding heat. A feature of the weld backing ring of the invention is the formation of circumferentially spaced indentations, notches, or weakened sections around its periphery, these forming weakened zones facilitating fragmentation of the ring for easy removal after the weld is completed.

Preferably, the backing ring of the invention is pressure molded of core sand and a phenolic or urea type resin binder. However, other suitable stable refractory materials are calcined kaoline or fire clay, kyanite, sillimanite, bauxite, fused alumina, and fused silica used in a granular form. Another binder is the aforementioned linseed oil.

The molded rings are baked or otherwise heated for a short time at a relatively low temperature. In the case of linseed oil as the binder, the baking is sufficient to oxidize the binder.

Under the welding heat, the binder evolves protective gases displacing air and oxygen in contact with the inside of the welded joint, due to heat disintegration of the binder, resulting in a smooth, clean, non-porous inside weld surface. The ring is easily removed, after completion of the weld, by striking the tubes with a hammer to shatter the ring, such shattering being facilitated by the weakened sections of the ring.

For an understanding of the invention principle, reference is made to the following description of a typical embodiment thereof as illustrated in the accompanying drawing. In the drawing:

Fig. 3 is a part sectional, part elevation view of the ring of Figs. 1 and 2 as positioned in tube ends prior to the formation of a fusion welded joint therebetween;

Fig. 4 is an axial sectional view illustrating the completed weld before removal of the ring.

Figure 1:
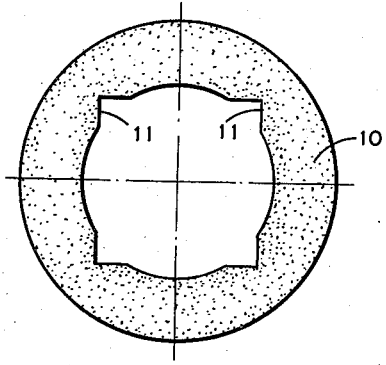
Fig. 1 is an elevation view of a weld backing ring embodying the invention.
Figure 5:
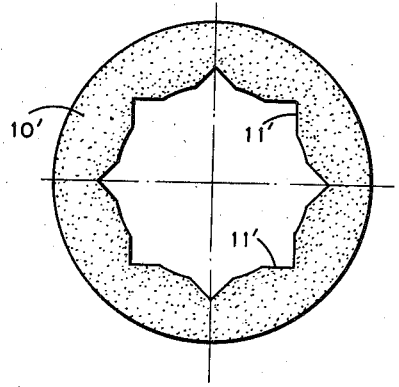
Fig. 5 is an elevation view of a modified form of the weld backing ring.
Figure 2:
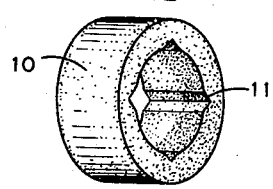
Fig. 2 is a perspective view of the ring.

Referring to Figs. 1, 2 and 5 of the drawing, the invention weld backing ring 10 or 10' is illustrated as being generally annular in form, with its external surface being substantially cylindrical. In accordance with the invention, the ring is provided with circumferentially spaced weakened sections or zones facilitating its impact disintegration after a welding operation is completed. Such weakened zones may be provided in any desired manner as, for example, making the inner periphery of the ring sinusoidal or sinuous in elevation, forming circumferentially spaced longitudinal holes through the ring, or notching the inner periphery of the ring. The latter arrangement is illustrated by way of a preferred example, notches 11 being shown as formed at circumferentially spaced intervals in the inner periphery of the ring. However, the other alternatives mentioned are equally effective in providing the weakened zones. The ring is pressure molded as, for example, by being formed by a core blowing machine.

The ring is formed from any suitable stable refractory, substantially non-fusible, granular material, such as core sand which is preferred. However, other materials such as calcined kaolin or fire clay, kyanite, sillimanite, bauxite, fused alumina, fused silica, and so forth, may be used in the granulated form. Before molding, the granulated material, such as the core sand, is mixed with an organic binder capable of evolving a protective gaseous atmosphere when heated as a result of the welding operation. For example, the granulated material may be bonded with linseed oil which is baked at a temperature and for a time sufficient to oxidize the linseed oil. However, a preferred binder is a synthetic resin of which necessitates less heating or curing to "set" the binder. For example, the core formed of granular material with the binder, when the binder is a synthetic resin, may be cured in approximately three minutes with dielectric heat or can be baked for about fifteen minutes in an oven at about 415° F. Suitable synthetic resins are phenol-formaldehyde resins or urea resins.

The ring, after pressure molding, must be cured to such an extent that it will stand handling and will retain its integrity or remain intact for at least the duration of the welding operation.

The weakened zones formed, for example, by the notches 11 or 11' assist in fragmentation of the ring after the weld is completed. In Figs. 1 and 2, the ring 10 is indicated as having four such notches or weakened zones, while Fig. 5 illustrates a ring with eight notches. The number of weakened zones is unimportant provided there is more than one, and may be varied in accordance with the size of the ring. The principal requirement is that more than one weakened zone be provided in order to provide for easy fragmentation of the ring after the weld is completed.

In performing a welding operation, such as to butt weld the ends of two tubes, the molded and cured ring is set into the adjacent end of a pair of tubes such as 15—15 having their abutting edges suitably shaped as at 16—16 to form a welding groove opening toward the inner surface of the tubes. With the ring 10 or 10' in place, weld metal 20 is deposited in the welding groove in any suitable manner. Preferably, the welding is effected at a high rate of speed, as by the use of an automatic welding machine. The inert gas shielded arc welding process known as "Sigma Argon" is especially suitable for applications in which the invention weld backing ring may be used.

During deposition of the weld metal 20 by electric arc welding, gas welding or any other metal deposition process, the welding heat causes the binder of the ring to evolve a protective gaseous atmosphere at the outer surface of the ring, which excludes air or oxygen from the weld. This protective gaseous atmosphere results in a clean, smooth and shiny interior surface on the weld 20, improving both the strength and appearance of the weld.

After the welding is completed, the ring is not disturbed for a short time, until it begins to decompose due to burning out of the resin by the welding heat. At such time, the tubes 15 or the joint 20 are struck with a hammer, or the like, which shatters the ring 10 or 10', particularly at the weakened portions represented by notches 11 or 11'. The shattered ring is thereafter easily removed by blowing through the tubes or by mechanical means.

Due to its refractoriness, the invention weld backing ring of granular material and a suitable bonding agent has sufficient integrity to stand up at least during the welding operation, while it is relatively easily shattered after exposure to the welding heat to provide for removal of the ring cleanly from the inside of the welding ring. The protective gaseous atmosphere evolved due to heating of the resin forms a clean and smooth inner surface on the weld.

While specific embodiments of the invention have been shown and described in detail to illustrate the application of the invention principles, it will be understood that the invention may be embodied otherwise without departing from such principles.

What is claimed is:

1. A backing device for disposition inside the adjacent ends of tubular metal members during formation of circumferential fusion welded joints therebetween by fusion weld metal deposition around the outside of said adjacent ends, said device comprising a pressure molded monolithic annular member of refractory granular material and an organic binder baked sufficiently to render said member selfsupporting for handling, the binder evolving a weld metal protective gaseous atmosphere when subjected to welding heat; the effects of the high temperatures involved in a fusion welding operation making uncertain the shattering of said annular member by impact on the metal members after completion of the welded joint therebetween; said annular member being formed with circumferentially spaced, open-ended notches extending longitudinally of its inner periphery assuring shattering thereof by impact on the metal members after completion of the welded joint; the outer periphery of said annular member having an uninterrupted cylindrical surface.

2. A backing device as claimed in claim 1 in which said notches are diametrically opposite each other.

3. A backing device as claimed in claim 1 in which said binder is selected from the class consisting of phenol-formaldehyde resins, urea resins, and linseed oil.

4. A backing device as claimed in claim 3 in which said binder is linseed oil.

5. A backing device as claimed in claim 1 in which said binder is a synthetic resin.

References Cited in the file of this patent

UNITED STATES PATENTS

| | | |
|---|---|---|
| 1,990,077 | Kershaw | Feb. 5, 1935 |
| 2,173,109 | Hamblin | Sept. 19, 1939 |
| 2,320,700 | Kent et al. | June 1, 1943 |
| 2,423,810 | Goulding | July 8, 1947 |
| 2,537,776 | Markl | Jan. 9, 1951 |
| 2,623,148 | Ronay | Dec. 23, 1952 |